June 30, 1970    W. W. BUDGE    3,517,648
METHOD AND APPARATUS FOR GROWING FREE OYSTER SEED
Filed Sept. 10, 1968
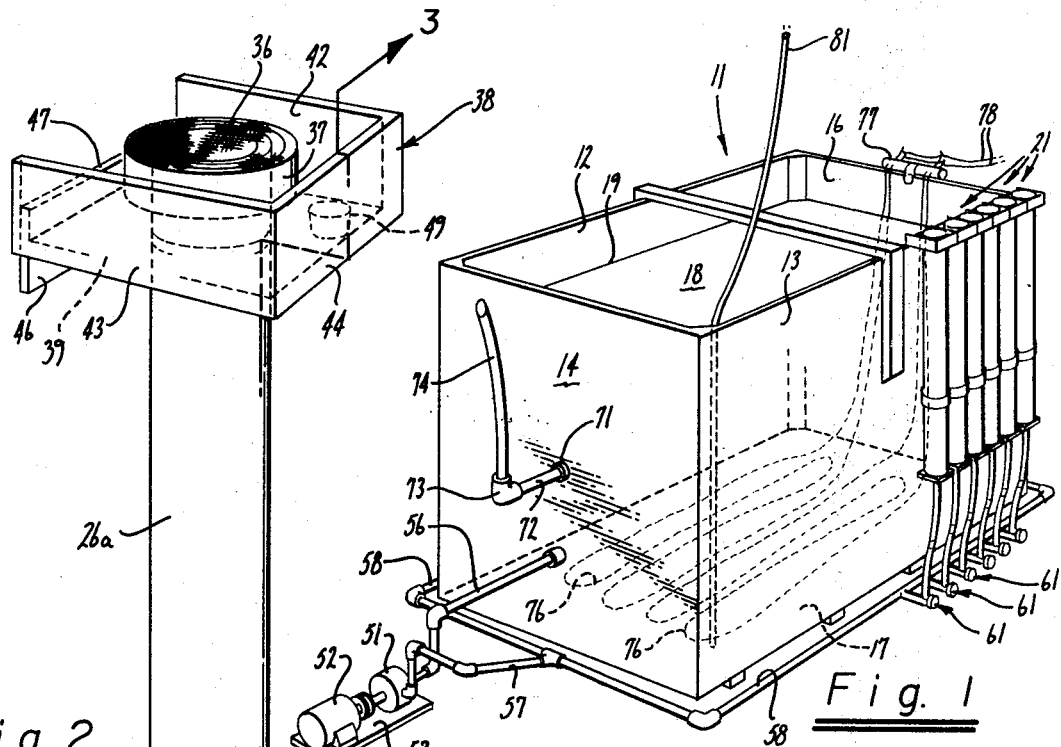
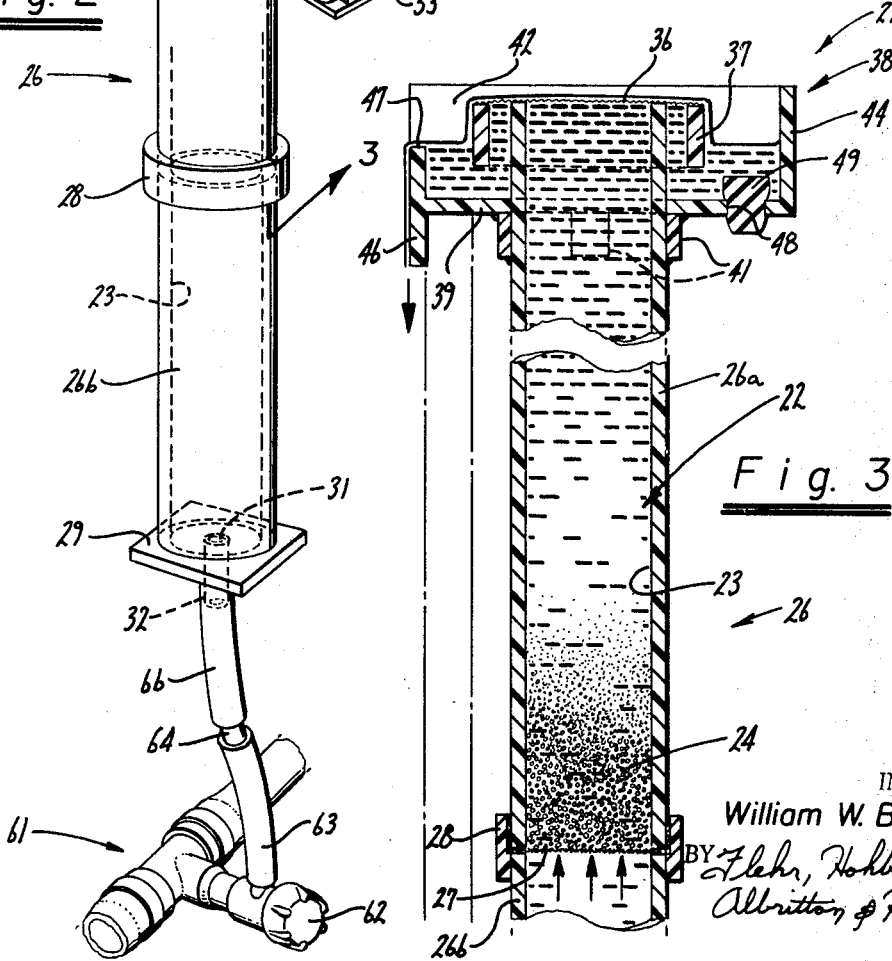
INVENTOR.
William W. Budge
BY Flehr, Hohbach, Test,
Albritton & Herbert
Attorneys

United States Patent Office 3,517,648
Patented June 30, 1970

3,517,648
METHOD AND APPARATUS FOR GROWING FREE OYSTER SEED
William W. Budge, Hillsborough, Calif., assignor to Pacific Mariculture Co., Inc., Pescadero, Calif., a corporation of California
Filed Sept. 10, 1968, Ser. No. 758,827
Int. Cl. A01k 61/00
U.S. Cl. 119—4                        15 Claims

ABSTRACT OF THE DISCLOSURE

The method and apparatus for growing free oyster seed in which water is continually introduced up through the oyster seed to thereby carry food to the oyster seed and also to carry away detritus from the oyster seed.

BACKGROUND OF THE INVENTION

In the growing of free oyster spat it has been the practice to utilize a large tank in which there are disposed a plurality of trays that float upon the top of the water. The bottoms of the trays are provided with fine screens which, when the traps are placed in the water, are immersed in the water in the tank. The oyster spat is placed on these screens in the trays. It has been found that in utilizing such apparatus that a tank is rapidly filled up with trays so that there is a limited capacity for growing free oyster spat unless a very substantial capital investment is made for more tanks and trays. In addition, only a very thin layer of oyster seed can be placed in each of the trays. Therefore, the oyster seed which can be grown within a tank or pool is limited by the surface area of the tank or pool. It also has been found that there is much labor involved in growing oyster spat or oyster seed in such apparatus in that the boxes or trays must be lifted up out of the tank or pool several times a week and to wash them off thoroughly to remove the detritus from the oyster seed. Also in order to keep the oyster seed from sticking to the sides of the trays or boxes it is necessary to periodically utilize high velocity jets of water to wash them off of the sides. There is therefore a need for new and improved method and apparatus for growing oyster seed.

SUMMARY OF THE INVENTION AND OBJECTS

The method of growing free oyster seed comprises placing oyster seed as a bed in a receptacle having a flow passage therethrough. Water is continuously introduced into the flow receptacle to cause the water to flow steadily through the bed of oyster seed and preferably in a direction opposite the force of gravity so that the flow of water has a tendency to lift or raise the oyster seed. The food required by the oyster seed is introduced into the water before the water enters the receptacle so that the food is moved past the oyster seed. The water, as it moves through the oyster seed, also serves to flush out and carry away any detritus from the oyster seed.

In the apparatus for growing the free oyster seed, one or more receptacles are utilized in conjunction with a large tank containing the water which is recirculated through the receptacles. The food is introduced in the water in the tank.

In general, it is an object of the present invention to provide a method and apparatus for growing oyster seed in which water is circulated through the oyster seed.

Another object of the invention is to provide method and apparatus of the above character in which the food is introduced into the water before it is circulated through the oyster seed.

Another object of the invention is to provide a method and apparatus of the above character in which the water is circulated through the oyster seed in such a direction that it counteracts the force of gravity and therefore tends to lift the oyster seed.

Another object of the invention is to provide a method and apparatus of the above character in which the food is introduced into a larger body of water and the larger body of water is recirculated through the oyster seed.

Another object of the invention is to provide an apparatus of the above character in which a single receptacle or a plurality of receptacles can be utilized for the growing of oyster seed and in which the receptacles can be supplied with water from a common body of water.

Another object of the invention is to provide a method and apparatus of the above character in which the circulating water removes the detritus from the oyster seed.

Additional objects and features of the invention will appear from the following description in which the preferred embodiments are set forth in detail in conjunction with the accompanying drawing.

BRIEF DESCRIPTION OF THE DRAWING

FIG. 1 is a perspective view of apparatus for growing oyster seed which incorporates the present invention and which can be utilized for practicing the method which incorporates the present invention.

FIG. 2 is an enlarged isometric view of one of the oyster seed growing assemblies shown in FIG. 1.

FIG. 3 is a cross-sectional view taken along the line 3—3 of FIG. 2.

DESCRIPTION OF THE PREFERRED EMBODIMENTS

The apparatus for growing free oyster seed is shown in FIG. 1 and consists of a large tank 11 which has a rectangular configuration and which has spaced parallel sidewalls 12 and 13, spaced parallel end walls 14 and 16 and a bottom wall 17. The tank 11 can be formed of any suitable material such as plywood which has been coated with an asphaltic compound and varnished so as to make it impervious to water. The tank 11 is substantially filled with the desired water 18 as, for example, the sea water which is to be utilized for growing the oyster seed. The water 18 is at a level 19 in the tank 11 as indicated in FIG. 1.

A plurality of oyster seed growing assemblies 21 are mounted on the sidewalls of tank 11. The oyster seed growing assemblies consist of a receptacle 22 which has a flow passage 23. The receptacle is adapted to receive a large quantity of oyster spat or oyster seed to form a bed as indicated at 24. The receptacle 22 can take any suitable form. Thus, as shown in FIGS. 1, 2 and 3, it can consist of a hollow cylindrical means 26 formed of a suitable material such as Plexiglas. The cylindrical means 26 can be formed in two sections 26a and 26b. A screen 27 of a relatively fine mesh to prevent oyster seed from passing therethrough extends across the passage 23 and is secured to the lower end of the section 26a and the top end of section 26b. The two sections, 26a and 26b are cemented together by suitable means such as a plastic cement to hold the screen 27 in place so that it extends across the passage 23. A reinforcing ring 28 is provided between the two sections 26a and 26b and reinforces the connection between the two sections.

A plate 29 also formed of suitable material such as Plexiglas is secured to the lower extremity of section 26b by suitable means such as cement. A hole 31 is provided in the plate 29 and is in communication with the interior of the section 26. A pipe 32 of suitable material such as plastic is mounted on the plate 29 and is in communication with the hole 31 provided in the plate 29.

A removable screen 36 is mounted on the top of the top section 26a of the tube or cylindrical means 26 and also is of a relatively fine mesh so that the oyster spat or seed cannot pass through as hereinafter described. The screen 36 is cemented to the top surface of a ring 37 of a suitable material such as plastic which has a diameter which is slightly greater than the diameter of the cylindrical means 26. As can be seen from FIG. 3, the weight of the ring 37 is sufficient to retain the screen 36 in close contact with the upper extremity of the cylindrical means 26.

A box-like construction 38 is mounted on top of the cylinder 26 and consists of a lower rectangular bottom plate 39 mounted upon the upper portion of this cylindrical means 26 and which is secured to the cylindrical means 26 by spaced reinforcing blocks 41 cemented to the cylindrical means 26 and also cemented to the plate 39. A pair of spaced parallel walls 42 and 43 are mounted upon the plate 39 which serves as a bottom wall. An end wall 44 is also provided on the plate 39 and adjoins the walls 42 and 43. Another end wall 46 is mounted upon the plate 39 so that approximately one-half of the wall extends below the plate 39 and the other one-half extends above the plate 39 as shown in FIG. 3.

As also shown in FIG. 3, the height of the walls 42, 43 and 44 is such that they extend slightly above the upper extremity of the cylindrical means 26. The wall 46 is positioned so that its upper surface 47 serves as a weir or discharge means as hereinafter described because it is substantially below the top surfaces of the walls 42, 43 and 44. The box-like structure 38 is provided with a hole 48 in the bottom plate 39 which is normally closed by a removable rubber stopper 49. The lower extremity of the wall 46 serves as a hook for holding the oyster seed growing assembly 21 on a side of the tank 21 as shown particularly in FIG. 1.

Means is provided for introducing a flow of water through the flow passage 23 in each of the receptacles 22 of the oyster seed growing assemblies 21 and consists of a pump 51 of the centrifugal type driven by a motor 52, both of which are mounted on a base 53. The inlet of the pump 51 is connected by piping 56 to the end wall 14 of the tank 11 at a point which is substantially above the bottom wall 17 of the tank 11. The outlet of the pump 51 is connected to piping 57 which is connected to additional piping 58 which forms a rectangular loop that completely surrounds the tank 11 as shown in FIG. 1.

Means is provided for connecting each of the oyster seed growing assemblies 21 to the piping 58 and consists of valve means 61 connected into the piping 58. The valve means 61 is provided with a handle or knob 62 to permit adjustment or metering of the flow through the valve means. The valve means 61 is connected by tubing 63 through a coupling 64 to tubing 66 which is mounted on the fitting 32 of the oyster seed growing assembly 21. Thus, as can be seen in FIG. 1, such valve control means 61 for adjusting the flow of water through each of the oyster seed growing assemblies is provided for each of the oyster seed growing assemblies 21.

Means is provided for draining some of the water from the tank 11 and consists of a fitting 71 mounted in the side wall of the tank 14 approximately one-half the distance from the top and bottom of the wall. A pipe 72 is rotatably mounted in the fitting 71 and carries an elbow 73. A relatively flexible plastic pipe 74 is mounted in the elbow 73. It can be seen that when the pipe 72 is rotated so that when the plastic pipe 74 depends downwardly, water will flow from the tank 11 and when it is in the raised position shown in FIG. 1, the water will not flow in the tank because the upper end of the pipe 74 is above the water level 19 within the tank 11.

The water 18 within the tank 11 is heated by a pair of elongate immersible heating elements 76 resting upon the bottom wall of the tank 11 and which are connected to a mounting 77. The heating elements 76 are connected to leads 78 which are connected to a source of power through thermostatically controlled means (not shown) so that the water within the tank 11 is maintained at a desired temperature.

Means is provided for supplying additional water to the tank 11 and consists of a tube 81 which extends down into the tank at one corner thereof as shown in FIG. 1. As hereinafter explained, this tube 81 can also be utilized for introducing the food to be utilized by the oyster seed into the large body of water 18 within the tank 11.

Operation of the apparatus in performing the method may now be described as follows. Let it be assumed that the sea water within the tank 11 has been raised to the desired temperature as, for example, 25° to 39° C. by the heaters 76. The free oyster spat or seed is then placed within the receptables 22 so that there is a bed 24 of oyster seed of substantial depth as, for example, several inches, disposed within the receptacle and resting upon the screen 27.

As soon as this has been done, the screen 36 can be put in place and then the valve 61 can be opened by knob 62 to permit water under pressure being supplied by the pump 51 to be forced through the screen 27 and through the oyster seed to completely fill the receptable 22. As soon as the receptable is filled, water overflows over the top rim of the cylindrical means 26 and travels downwardly into the box-like construction 38 until it is filled as shown in FIG. 3 and then travels over the surface 47 of the plate 46 which serves as a weir and back into the tank 11. The same procedure is followed for each of the oyster seed growing assemblies. It can be seen that the water is continuously recirculated by the pump 51 by forcing it through the oyster seed growing assemblies 21 after which it flows back into the tank 11 for recirculation.

In the operation of the apparatus in performing the method, it has been found to be very desirable to cause the water to flow in a direction which is against the force of gravity upon the oyster seed and also to have the water flow through the oyster seed sufficiently rapidly so that the oyster spat or seeds do not exert any downward force on each other and do not rest upon the screen 27 during the time the water is flowing. It is also important that the flow of water through the passage 23 should not be sufficiently rapid to cause a large amount of turbulance within the passage which would seriously disturb the oyster seed. It is believed that this sort of free-floating condition for the oyster seed or spat is very desirable for the the rapid growth of the oyster seed. It is believed that this condition is particularly desirable to encourage feeding of the oyster seed.

The feeding of the oyster seed is preferably accomplished by introducing heated sea water which has been enriched with planktonic food suitable for oyster feed into the tank through the tube 81. The food can be introduced substantially continuously or periodically if desired. For example, it has been found that the planktonic food can be introduced substantially continuously except for a small period as hereinafter described.

As soon as the food has been introduced, the food is intermixed in the water in the tank and it is circulated by the pump 51 through the oyster seed growing assemblies 21. It is believed that since the oyster seed are in a relatively free-floating condition within the receptacle that it enables them to feed with very little effort because the food is passing upwardly through the oyster seed so that it can be readily collected by the oyster seed.

At the same time that the water is flowing upwardly through the oyster seed, the water continuously washes the oyster seed and removes any detritus therefrom. The detritus moves upwardly through the screen and passes downwardly into the box-like construction 38 where it has a tendency to collect on the bottom plate 39. At periodic intervals the stoppers 49 can be removed and the detritus collected in the box-like constructions can be flushed through the holes 48. In this way, very little detritus enters the tank 11. In the event detritus does enter the tank 11, it has a tendency to settle to the bottom of the tank. Since the piping 56 for the pump 51 is substantially above the bottom wall, there will be no tendency to recirculate the detritus and therefore substantially clean sea water will be continuously recirculated through the oyster seed growing asemblies 21.

It may be desirable to periodically introduce fresh sea water into the tank 11. For this purposes, the pipe 74 can be turned downwardly to drain a substantial quantity of the sea water from the tank 11 and thereafter, new sea water can be introduced through the pipe 81. It would be desirable to stop the introduction of the food into the sea water in the tank 11 several hours before water is drained from the tank so as not to waste the food. In this way, oyster seed can remove substantially all of the food from the sea water before any water is drained from the tank.

As can be seen, the construction of the apparatus is such so that a plurality of oyster seed growing assemblies 21 can be mounted on each side of the tank 11 although in FIG. 1, only a few oyster seed growing assemblies 21 have been provided on one side of the tank.

It is believed that the present apparatus and method is particularly desirable for the growing of oyster seed because it answers all of the biological requirements of the oyster seed namely, in supplying the seed with a steady stream of food and flushing away the waste material. There is no pressure upon the oyster seed to inhibit their feeding even though they are deeply immersed in sea water. As explained previously, the force of the sea water flowing through the passage 23 lifts the weight of the individual oyster seed or animal so that it is substantially free-floating and can feed normally even though there may be many thousands of oyster seeds above and below that particularly oyster seed or animal and in relatively close proximity thereto.

With the construction shown, water can flow through the passage 23 relatively freely while the escape of oyster seed from passage 23 is prevented by the screens 27 and 36.

It has been found that it is possible to obtain a good approximation of the growth of the animals during each 24 hour period by turning the valve off to prevent further flow of the water through the passage 23. The spat or seed all settle down upon the screen 27 and the upper surface thereof defines a visual level for the spat. A mark can be provided on the cylinder indicating the level. The valve can then be opened and the oyster seed can continue to feed through the next 24 hour period. The same operation can then be performed the following day to shut off the flow of water through the passage 23. The increase in height of the bed of oyster seed in comparison to the height ascertained the previous day can be readily determined. By way of example, it has been found that it is possible with the present apparatus and method to achieve a growth rate of 15% per day.

In addition to the foregoing advantages, it has been found that use of the apparatus and method also is advantageous because since there is a continual slight movement of the oyster seed, there is no opportunity for the oyster seed to stick to each other or to the walls of the tube or even to the screen 27 on the bottom of the tube.

It is apparent from the foregoing that there has been provided a new and improved method and apparatus for growing free oyster seed which has any advantages. It permits the growing of larger quantities of oyster seed in relatively small space. In addition, they can be grown to such a size that they are large enough to place directly in oyster beds for growing to an adult size.

I claim:

1. In a method for growing free oyster seed, placing the oyster seed in a flow passage of a receptacle so as to form a bed of oyster seed therein, continuously introducing water into the receptacle to cause the water to flow through the bed of oyster seed in a direction that is opposite the force of gravity upon the oyster seed and introducing food for the oyster seed into the water before it is introduced into the receptacle so that the food is moved through the oyster seed, said water serving to flush out and carry away the detritus from the oyster seed as it passes through the oyster seed.

2. A method as in claim 1 wherein the flow of water through the oyster seed is sufficiently rapid so that the oyster seed are substantially free-floating within the water and do not rest upon each other.

3. A method as in claim 1 wherein the food is introduced into a large body of water together with the step of recirculating the water from the large body of water with food therein through the receptacle to provide the flow of water through the receptacle.

4. A method as in claim 3, together with the step of collecting the detritus after the water flows from the receptacle and periodically removing the detritus so that the detritus does not enter the large body of water.

5. In apparatus for growing free oyster seed, means forming a receptacle having a flow passage therethrough and adapted to receive free oyster seed to form a bed of oyster seed therein, and means connected to said means forming a receptacle for introducing water therein in a direction to cause the water to flow upwardly through the passage and through any oyster seed in the passage and means for removing the water from the receptacle after it has passed therethrough and recirculating it through the receptacle.

6. Apparatus as in claim 5, together with a screen mounted in said receptacle and extending across the passage to prevent the flow of oyster seed therethrough, said oyster seed being adapted to rest upon the said screen, said screen permitting the flow of water therethrough and through the oyster bed.

7. Apparatus as in claim 5 wherein said receptacle is positioned so that said passage extends in a generally vertical direction and wherein said means for introducing water into the receptacle introduces the water in a direction which is opposite the force of gravity upon the oyster seed.

8. Apparatus as in claim 5 together with valve means for adjusting the flow of water through said receptacle so that the flow is such as to lift the oyster seed so they do not rest upon each other or upon the screen and without introducing substantial turbulence into the water.

9. Apparatus as in claim 7 together with an additional screen disposed in said passage above said bed of oyster seed and preventing the passage of oyster seed therethrough.

10. Apparatus as in claim 5 wherein said means for removing and recirculating the water includes a tank adapted to contain a body of water, pump means connected to the tank for withdrawing water from the tank and introducing it into the receptacles and means for collecting the water discharged from the receptacles and introducing it into the tank.

11. In apparatus for growing free oyster spat, a tank having at least one side wall and adapted to contain a quantity of water, at least one oyster seed growing assembly mounted on the side wall of the tank, said one oyster growing assembly having a receptacle with a flow pasage therein, means within the passage of the receptacle for retaining therein a quantity of oyster seed but permitting water to flow therethrough, a pump having an inlet and an outlet, means connecting the inlet of the pump to the tank, means connecting the outlet of the pump to the receptacle to cause water to be drawn from the tank and to be introduced into the receptacle and to flow upwardly through the bed of oyster seed against the force of gravity on the oyster seed and means for collecting the water flowing through the passage in said receptacle and for returning the same to the tank.

12. Apparatus as in claim 11 together with valve means for controlling the flow of water through said receptacle.

13. Apparatus as in claim 11 wherein said receptacle is in a form of a generally vertical elongate hollow member with a passage therethrough and wherein said means enclosing oyster seed within the receptacle consists of first and second screens carried by the member and extending across the passage in the member.

14. Apparatus as in claim 13 wherein said means for collection of the water from the receptacle as it is discharged from the receptacle consists of a structure mounted upon the upper end of the member and having discharge opening which is below the level of discharge from said member and having a bottom wall below said discharge opening so that detritus in the water discharged from the member settles in said structure and means carried by the structure permitting removal of the detritus collected in the structure.

15. Apparatus as claim 14 wherein said structure is mounted on said wall of the tank so that the discharge of water therefrom is directly into said tank.

References Cited

UNITED STATES PATENTS

| | | | |
|---|---|---|---|
| 1,933,950 | 11/1933 | Wells | 119—4 |
| 3,192,899 | 7/1965 | Lucey et al. | 119—4 |
| 3,196,833 | 7/1965 | Glancy | 119—4 |
| 3,418,138 | 12/1968 | Dennis et al. | 119—4 X |

OTHER REFERENCES

Experiments In Artificial Propagation of Oysters, Dept. Of Commerce, Bureau Of Fisheries, Document No. 961, Wash., Gov. Printing Office, 1924, pp. 11 and 12, by H. F. Prytherch.

ALDRICH F. MEDBERY, Primary Examiner

U.S. Cl. X.R.

119—2